(12) United States Patent
Cruz Serna

(10) Patent No.: US 11,033,046 B2
(45) Date of Patent: Jun. 15, 2021

(54) LIPID POWDER COMPOSITION COMPRISING A SALT MIXTURE

(71) Applicant: TEAM FOODS COLOMBIA S.A., Bogotá (CO)

(72) Inventor: Adriana Fernanda Cruz Serna, Bogotá (CO)

(73) Assignee: Team Foods Colombia S.A., Bogota (CO)

( * ) Notice: Subject to any disclaimer, the term of this patent is extended or adjusted under 35 U.S.C. 154(b) by 283 days.

(21) Appl. No.: 16/194,840

(22) Filed: Nov. 19, 2018

(65) Prior Publication Data

US 2019/0082726 A1 Mar. 21, 2019

Related U.S. Application Data (63) Continuation of application No. PCT/IB2017/000723, filed on May 24, 2017.

(60) Provisional application No. 62/340,819, filed on May 24, 2016.

(51) Int. Cl.
*A23L 27/40* (2016.01)
*A23L 27/20* (2016.01)
*A23D 7/005* (2006.01)

(52) U.S. Cl.
CPC ............ *A23L 27/40* (2016.08); *A23D 7/0053* (2013.01); *A23L 27/2026* (2016.08); *A23V 2002/00* (2013.01)

(58) Field of Classification Search
CPC ... A23L 27/40; A23L 27/2026; A23D 7/0053; A23D 7/011; A23V 2002/00
See application file for complete search history.

(56) References Cited

U.S. PATENT DOCUMENTS

| | | | | |
|---|---|---|---|---|
| 8,920,862 | B2 * | 12/2014 | Sagalowicz | A23L 27/215 426/533 |
| 2003/0148006 | A1 * | 8/2003 | van Aefferden | A23L 27/40 426/293 |
| 2011/0097449 | A1 * | 4/2011 | Jensen | A23L 13/428 426/74 |
| 2014/0227242 | A1 * | 8/2014 | Bromley | A61K 31/593 424/94.1 |
| 2014/0248410 | A1 * | 9/2014 | Kitaoka | A23D 7/011 426/540 |

FOREIGN PATENT DOCUMENTS

| | | |
|---|---|---|
| EP | 0764407 A2 | 3/1997 |
| EP | 1661469 A1 | 5/2006 |
| GB | 2520370 A | 5/2015 |
| WO | 9740704 A1 | 11/1997 |
| WO | 0162107 A1 | 8/2001 |

OTHER PUBLICATIONS

Jiang et al. Profiling of Fatty Acids Composition in Suet Oil. Int. J. Mol. Sci. 2015, vol. 16, pp. 2864-2878.*
Orsavova et al. Fatty Acids Composition of Vegetable Oils. Int. J. Mol. Sci. 2015, vol. 16, p. 12871-12890.*
International Search Report and Written Opinion issued in PCT/IB2017/000723, dated Sep. 21, 2017.

* cited by examiner

*Primary Examiner* — Anthony J Weier
(74) *Attorney, Agent, or Firm* — BakerHostetler (57) ABSTRACT

The present invention, in an embodiment, is a powder composition that includes 20 to 80 weight % of a triglycerides mixture and 15 to 75 weight % of a salt mixture. The triglyceride mixture, based on a total fatty acid content of the triglycerides mixture, includes: 5% to 55% lauric acid content, 2% to 30% myristic acid content, 6% to 45% palmitic acid content, and 2% to 25% stearic acid content; 15% to 45% oleic acid content, 15% or less linoleic acid content, 10% or less linolenic acid content; and less than 2% of trans fatty acids; wherein, the salt mixture includes at least 90 weight % sodium chloride, based on the total weight of the salt mixture and a remainder includes at least one of sodium citrate, disodium citrate, monosodium tartrate, or disodium tartrate.

20 Claims, 3 Drawing Sheets

LIPID POWDER COMPOSITION
COMPRISING A SALT MIXTURE

RELATED APPLICATIONS

This application is a continuation of International Application No. PCT/IB2017/000723, filed May 24, 2017 designating the U.S., which claims the priority of U.S. provisional application Ser. No. U.S. Ser. No. 62/340,819, entitled "Lipid Powder Composition" filed May 24, 2016, which is incorporated herein by reference in its entirety for all purposes.

BACKGROUND OF INVENTION

Salt is one of the oldest and most widely used condiments or seasonings in the food industry for its ability to enhance flavors and being one of the main sources of sodium in the consumers diet, which is essential for the proper functioning of muscles and nerves, so as blood pressure control and blood volume.

However, the high intake of salt, specifically sodium chloride, can be harmful to health because there is an association of this factor with the incidence of diseases such as hypertension, cardiovascular diseases (such as heart attacks, strokes, among others), kidney failure, osteoporosis and stomach cancer, among others.

Therefore, it is necessary to find different forms or products that allow reducing the intake of sodium chloride. To meet this objective, various solutions have been proposed at industrial level, such as replacing sodium chloride with potassium chloride, as well as the use of additives such as masking agents and flavor mitigators that, even if they allow reducing the amount of salt added to different food products, they can provide residual notes of unpleasant bitter taste, or simply not achieve an effective replacement of sodium chloride, both sensory and functional.

In addition to the above, other types of food or seasoning compositions have also been developed, which may or may not contain salt, which contribute to or enhance the flavor of the food and could also serve to reduce and/or eliminate the need to add salt to the food. Therefore, it is necessary to study and develop different alternatives of seasonings that are good candidates to replace salt added to food.

In this way, EP 1661469 discloses an oil-based semiliquid composition used in the process of marinating fresh meat which is then marketed or processed in the industry, which comprises an oil or a mixture of oils having a melting point between 15 and 25° C. and other additives comprising seasonings, flavors, dyes, among others, which comprise salts, spice extracts, flavor enhancers, emulsifiers and antioxidants. This composition is stable after being frozen; it also favors the release of certain flavor profiles in the final preparation made by the user, and improves the presentation and appearance of the final product. However, this document does not mention that said composition can be used to significantly reduce the amount of salt added to the meat.

WO 0162107 also shows a seasoning mixture for marinating food containing salt and a liquefiable agent selected from hydrocolloids, gelatin, emulsifiers and carbohydrates, wherein said liquefiable mixture can be used in a mixture with liquefiable fat. The disclosed mixture can be mixed with a liquid or melted to form a viscous mixture, which seeks to homogenously distribute the salt throughout the food, and solidifies after its application forming a layer in the food that can be 0.1 to 2 mm thick, achieving an improvement in the coverage of different foods, but without taking into account the final content of sodium chloride in the food.

In addition, EP 0764407A teaches a seasoning mixture comprising a dry mixture of seasoning salts covered by any fat that also contains a special adhesive agent, which can be selected from the group consisting of native starch, baking powder, soybean powder, maltodextrin and skimmed milk powder. Said composition is uniformly distributed over a frozen food containing water, avoiding the effect of thawing of the water caused by the seasoning salts when applied to a frozen food. However, said mixture does not demonstrate, or at least indicates, that the amount of sodium chloride added to the food will be less than what would be normally added.

On the other hand, WO 97/40704 discloses salt-like compositions containing sodium chloride and a binding matrix, to which flavorings or dyes can be added, and serve as salt substitutes to decrease the additional proportion of the same in food. The composition disclosed by this patent application comprises sodium chloride crystals, as well as sodium and chlorine ions, dispersed on the surface of the matrix, which is selected from starches, sugars, modified starches, dextrins, gums, proteins, sugar syrup solids, modified celluloses and derivatives and mixtures thereof. In addition, the composition defined by said document may contain, among others, flavorings, oleoresins, essences, extracts, oils, seasoning mixtures, natural flavors, dried herbs and spices and fresh or frozen herbs, which have the function of flavoring the composition. However, the use of carbohydrate matrices could exclude the use of this composition in users who have diabetes or sugar problems.

Finally, GB 2520370A defines a topical seasoning for snack foods, comprising a solution of sodium chloride encapsulated in fat (specifically triglycerides and monoglycerides), which seeks to reduce the amount of salt added to the snack, achieving the taste sensation salty desired for the food to be consumed. However, said document only considers the salty taste and the texture of the snack when evaluating the taste sensation, thus it is unknown if this composition provides a flavor that is totally pleasant to the consumer.

Taking into account all the above, the state of the art does not teach a composition capable of decreasing the amount of salt in food, and that also retains the taste sensation that salt confers to the food product, as well as the enhancement of flavors that it produces inside a food matrix. Therefore, it is evident the need to continue developing alternative food compositions with different matrices that allow to significantly reduce the addition of salt to food products, preserving a flavor similar to what would be if a standard salt amount were added.

TECHNICAL FIELD

The present invention relates to food compositions capable of decreasing the amount of sodium chloride in a snack-type food matrix maintaining the perception of salty taste and enhancing other specific flavor notes that sodium chloride brings to said matrix. Specifically, the present invention relates to compositions of lipids, sodium chloride and ingredients with defined technological function, which allows a controlled transport and release of salty taste when melted in the mouth at body temperature conditions during mastication, achieving a longer duration in the mouth and generating an enhanced salty taste that, consequently, makes the flavors of the food better perceived.

BRIEF SUMMARY OF INVENTION

In an embodiment, the present invention is a powder composition comprising: 20 weight % to 80 weight % of a triglycerides mixture, based on a total weight of the powder composition; and 15 weight % to 75 weight % of a salt mixture, based on the total weight of the powder composition; wherein, based on a total fatty acid content of the triglycerides mixture, the triglyceride mixture comprises: between 5% and 55% lauric acid content, between 2% and 30% myristic acid content, between 6% and 45% palmitic acid content, and between 2% and 25% stearic acid content; between 15% and 45% oleic acid content, 15% or less linoleic acid content, 10% or less linolenic acid content; and less than 2% of trans fatty acids; wherein, the salt mixture comprises, at least 90 weight % sodium chloride, based on the total weight of the salt mixture and a remainder comprises at least one of sodium citrate, disodium citrate, monosodium tartrate, or disodium tartrate.

In another embodiment, the powder composition further comprises 5 weight % to 30 weight % of a polysaccharides mixture, based on the total weight of the powder composition. In the embodiment, the polysaccharides mixture comprises 50 weight % to 99 weight % of maltodextrin of 20 dextrose equivalents based a total weight of the polysaccharides mixture. In yet another embodiment, the polysaccharides mixture comprises 50 weight % to 99 weight % of maltodextrin of 10 dextrose equivalents based a total weight of the polysaccharides mixture. In other embodiments, the polysaccharides mixture comprises 0.1 weight % to 30 weight % of glucose of 30 dextrose equivalents based a total weight of the polysaccharides mixture. In yet another embodiment, the polysaccharides mixture comprises 0.1 weight % to 30 weight % of fructose polymers based a total weight of the polysaccharides mixture, wherein the fructose polymers comprise at least one of inuline, oligofructose or polydextrose.

In other embodiments, the powder composition comprises 0.1 weight % to 25 weight % of a protein mixture, based a total weight of the powder composition. In the embodiment, the protein mixture comprises at least one of vegetable proteins or animal proteins. In yet other embodiments, the protein mixture comprises at least one of sodium caseinate, calcium caseinate, soybean concentrate protein, albumin concentrate protein, or bovine serum concentrate protein. In embodiments, the protein mixture comprises: 80 weight % to 100 weight % of the sodium caseinate, if present, and the calcium caseinate, if present, based on a total weight of the protein mixture, 0.1 weight % to 15 weight % of the soybean concentrate protein, if present, based on the total weight of the protein mixture, 0.1 weight % to 15 weight % of the albumin concentrate protein, if present, based on the total weight of the protein mixture, and 0.1 weight % to 10 weight % of the bovine serum concentrate protein, if present, based on the total weight of the protein mixture.

In embodiments, the powder composition comprises: 80 weight % to 100 weight % of the sodium caseinate and the calcium caseinate, based on the total weight of the protein mixture, 0.1 weight % to 15 weight % of the soybean concentrate protein, based on the total weight of the protein mixture, 0.1 weight % to 15 weight % of the albumin concentrate protein, based on the total weight of the protein mixture, and 0.1 weight % to 10 weight % of the bovine serum concentrate protein, based on the total weight of the protein mixture.

In other embodiments, the powder composition comprises 0.1 weight % to 10 weight % of an emulsifier, based on the total weight of the powder composition. The embodiments, the emulsifier comprises at least one of polysorbates, diacetyl tartaric esters, sorbitan esters, vegetable fatty acid esters and polyesters, ricinoleic acid esters and polyesters, lactic acid esters and polyesters, citric acid esters and polyesters, acetic acid esters and polyesters, monoglycerides and diglycerides of fatty acids, or lecithin.

In yet other embodiments, the powder composition comprises 0.1 weight % to 10 weight % of a flavor mixture, based on the total weight of the powder composition; wherein the flavor mixture comprises at least one of vegetable species, salt, fruits, spicy/hot tastes, cheese, caramel, butter, or sweet tastes. In yet other embodiments, the powder composition comprises ° weight % to 10 weight % of a flavor mixture, based on the total weight of the powder composition; wherein the flavor mixture comprises at least one of vegetable species, salt, fruits, spicy/hot tastes, cheese, caramel, butter, or sweet tastes.

In another embodiment, the powder composition comprises 0.1 weight % to 10 weight % of a color mixture, based on the total weight of the powder composition, wherein the color mixture selected of the group of yellow, orange, red, blue, green, violet, brown, or caramel. In another embodiment, the powder composition comprises 0 weight % to 10 weight % of a color mixture, based on the total weight of the powder composition, wherein the color mixture selected of the group of yellow, orange, red, blue, green, violet, brown, or caramel.

In yet another embodiment, the powder composition comprises 0.01 weight % to 5 weight % of at least one of antioxidants or preservatives, based on the total weight of the powder composition, wherein the at least one of the antioxidants or the preservatives comprises at least one of TBHQ, BHT, ascorbil palmitate, propyl gallate, citric acid, tocopherols, tocotrienols, hidroxitiroxsol, resveratrol, or rosemary extract.

In embodiments, the powder composition comprises 0.01 weight % to 3 weight % of anticaking agents, based on the total weight of the powder composition, wherein the anticaking agents comprise at least one of silica dioxide, tricalcic phosphate, or calcium silicate.

In other embodiments, a sodium content of the powder composition is 5 weight % to 30 weight %, based on the total weight of the powder composition.

In embodiments, a moisture content of the powder composition is 0 weight % to 2 weight %, based on the total weight of the powder composition.

In yet other embodiments, a particle size of the powder is in the range of 400 microns to 1200 microns.

In embodiments, the triglyceride mixture could be produced from the at least one of the following oils and fats: palm oil and/or its fractions, palm kernel oil and/or its fractions, coconut oil and/or its fractions, soybean oil, rapeseed oil, canola oil, sunflower oil and the high oleic versions of these oils.

In embodiments, a sodium content of the powder composition is 15% to 70% less by weight in comparison with a standard sodium chloride salt.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

DETAILED DESCRIPTION OF THE INVENTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "at least one of A, B, or C" and the like, means "only A", "only B", "only C", or "any combination of A, B, and C."

In an embodiment, the present invention is a powder composition comprising: 20 weight % to 80 weight % of a triglycerides mixture, based on a total weight of the powder composition; and 15 weight % to 75 weight % of a salt mixture, based on the total weight of the powder composition; wherein, based on a total fatty acid content of the triglycerides mixture, the triglyceride mixture comprises: between 5% and 55% lauric acid content, between 2% and 30% myristic acid content, between 6% and 45% palmitic acid content, and between 2% and 25% stearic acid content; between 15% and 45% oleic acid content, 15% or less linoleic acid content, 10% or less linolenic acid content; and less than 2% of trans fatty acids; wherein, the salt mixture comprises, at least 90 weight % sodium chloride, based on the total weight of the salt mixture and a remainder comprises at least one of sodium citrate, disodium citrate, monosodium tartrate, or disodium tartrate.

In another embodiment, the powder composition further comprises 5 weight % to 30 weight % of a polysaccharides mixture, based on the total weight of the powder composition. In the embodiment, the polysaccharides mixture comprises 50 weight % to 99 weight % of maltodextrin of 20 dextrose equivalents based a total weight of the polysaccharides mixture. In yet another embodiment, the polysaccharides mixture comprises 50 weight % to 99 weight % of maltodextrin of 10 dextrose equivalents based a total weight of the polysaccharides mixture. In other embodiments, the polysaccharides mixture comprises 0.1 weight % to 30 weight % of glucose of 30 dextrose equivalents based a total weight of the polysaccharides mixture. In yet another embodiment, the polysaccharides mixture comprises 0.1 weight % to 30 weight % of fructose polymers based a total weight of the polysaccharides mixture, wherein the fructose polymers comprise at least one of inuline, oligofructose or polydextrose.

In other embodiments, the powder composition comprises 0.1 weight % to 25 weight % of a protein mixture, based a total weight of the powder composition. In the embodiment, the protein mixture comprises at least one of vegetable proteins or animal proteins. In yet other embodiments, the protein mixture comprises at least one of sodium caseinate, calcium caseinate, soybean concentrate protein, albumin concentrate protein, or bovine serum concentrate protein. In embodiments, the protein mixture comprises: 80 weight % to 100 weight % of the sodium caseinate, if present, and the calcium caseinate, if present, based on a total weight of the protein mixture, 0.1 weight % to 15 weight % of the soybean concentrate protein, if present, based on the total weight of the protein mixture, 0.1 weight % to 15 weight % of the albumin concentrate protein, if present, based on the total weight of the protein mixture, and 0.1 weight % to 10 weight % of the bovine serum concentrate protein, if present, based on the total weight of the protein mixture.

In embodiments, the powder composition comprises: 80 weight % to 100 weight % of the sodium caseinate and the calcium caseinate, based on the total weight of the protein mixture, 0.1 weight % to 15 weight % of the soybean concentrate protein, based on the total weight of the protein mixture, 0.1 weight % to 15 weight % of the albumin concentrate protein, based on the total weight of the protein mixture, and 0.1 weight % to 10 weight % of the bovine serum concentrate protein, based on the total weight of the protein mixture.

In other embodiments, the powder composition comprises 0.1 weight % to 10 weight % of an emulsifier, based on the total weight of the powder composition. The embodiments, the emulsifier comprises at least one of polysorbates, diacetyl tartaric esters, sorbitan esters, vegetable fatty acid esters and polyesters, ricinoleic acid esters and polyesters, lactic acid esters and polyesters, citric acid esters and polyesters, acetic acid esters and polyesters, monoglycerides and diglycerides of fatty acids, or lecithin.

In yet other embodiments, the powder composition comprises 0.1 weight % to 10 weight % of a flavor mixture, based on the total weight of the powder composition; wherein the flavor mixture comprises at least one of vegetable species, salt, fruits, spicy/hot tastes, cheese, caramel, butter, or sweet tastes. In yet other embodiments, the powder composition comprises 0 weight % to 10 weight % of a flavor mixture, based on the total weight of the powder composition; wherein the flavor mixture comprises at least one of vegetable species, salt, fruits, spicy/hot tastes, cheese, caramel, butter, or sweet tastes.

In another embodiment, the powder composition comprises 0.1 weight % to 10 weight % of a color mixture, based on the total weight of the powder composition, wherein the color mixture selected of the group of yellow, orange, red, blue, green, violet, brown, or caramel. In another embodiment, the powder composition comprises 0 weight % to 10 weight % of a color mixture, based on the total weight of the powder composition, wherein the color mixture selected of the group of yellow, orange, red, blue, green, violet, brown, or caramel.

In yet another embodiment, the powder composition comprises 0.01 weight % to 5 weight % of at least one of antioxidants or preservatives, based on the total weight of the powder composition, wherein the at least one of the antioxidants or the preservatives comprises at least one of TBHQ, BHT, ascorbil palmitate, propyl gallate, citric acid, tocopherols, tocotrienols, hidroxitiroxsol, resveratrol, or rosemary extract.

In embodiments, the powder composition comprises 0.01 weight % to 3 weight % of anticaking agents, based on the total weight of the powder composition, wherein the anticaking agents comprise at least one of silica dioxide, tricalcic phosphate, or calcium silicate.

In other embodiments, a sodium content of the powder composition is 5 weight % to 30 weight %, based on the total weight of the powder composition.

In embodiments, a moisture content of the powder composition is 0 weight % to 2 weight %, based on the total weight of the powder composition.

In yet other embodiments, a particle size of the powder is in the range of 400 microns to 1200 microns.

In embodiments, the triglyceride mixture could be produced from the at least one of the following oils and fats: palm oil and/or its fractions, palm kernel oil and/or its fractions, coconut oil and/or its fractions, soybean oil, rapeseed oil, canola oil, sunflower oil and the high oleic versions of these oils.

In embodiments, a sodium content of the powder composition is 15% to 70% less by weight in comparison with a standard sodium chloride salt.

In embodiments, the present invention is a lipid powder composition than can reduce the sodium level of food up to 70%, having a salty taste close to sodium chloride while generating a special performance in the salty flavor release at the time of consumption. In embodiments, the lipid powder composition can be used for snacks, bakery, dairy and culinary applications separately or in combination with sodium chloride.

In other embodiments, the present invention is powder composition that includes 20 weight % to 80 weight % of a triglycerides mixture, based on a total weight of the powder composition; 15 weight % to 75 weight % of a salt mixture, based on the total weight of the powder composition; 5 weight % to 30 weight % of polysaccharides mixture, based on the total weight of the powder composition; 0.1 weight % to 25 weight % of a protein mixture, based on the total weight of the powder composition; and 0.1 weight % to 10 weight % of an emulsifier, based on the total weight of the powder composition.

In the embodiments, the powder composition includes 20 weight % to 80 weight % of a triglycerides mixture, based on a total weight of the powder composition. In the embodiments, the powder composition includes 30 weight % to 80 weight % of a triglycerides mixture, based on a total weight of the powder composition. In the embodiments, the powder composition includes 40 weight % to 80 weight % of a triglycerides mixture, based on a total weight of the powder composition. In the embodiments, the powder composition includes 50 weight % to 80 weight % of a triglycerides mixture, based on a total weight of the powder composition. In the embodiments, the powder composition includes 60 weight % to 80 weight % of a triglycerides mixture, based on a total weight of the powder composition. In the embodiments, the powder composition includes 70 weight % to 80 weight % of a triglycerides mixture, based on a total weight of the powder composition.

In the embodiments, the powder composition includes 20 weight % to 70 weight % of a triglycerides mixture, based on a total weight of the powder composition. In the embodiments, the powder composition includes 20 weight % to 60 weight % of a triglycerides mixture, based on a total weight of the powder composition. In the embodiments, the powder composition includes 20 weight % to 50 weight % of a triglycerides mixture, based on a total weight of the powder composition. In the embodiments, the powder composition includes 20 weight % to 40 weight % of a triglycerides mixture, based on a total weight of the powder composition. In the embodiments, the powder composition includes 20 weight % to 30 weight % of a triglycerides mixture, based on a total weight of the powder composition.

In the embodiments, the powder composition includes 30 weight % to 70 weight % of a triglycerides mixture, based on a total weight of the powder composition. In the embodiments, the powder composition includes 40 weight % to 60 weight % of a triglycerides mixture, based on a total weight of the powder composition.

In some embodiments, the triglycerides mixture includes between 5% and 55% lauric acid content, based on a total fatty acid content of the triglycerides mixture. In some embodiments, the triglycerides mixture includes between 15% and 55% lauric acid content, based on a total fatty acid content of the triglycerides mixture. In some embodiments, the triglycerides mixture includes between 25% and 55% lauric acid content, based on a total fatty acid content of the triglycerides mixture. In some embodiments, the triglycerides mixture includes between 35% and 55% lauric acid content, based on a total fatty acid content of the triglycerides mixture. In some embodiments, the triglycerides mixture includes between 45% and 55% lauric acid content, based on a total fatty acid content of the triglycerides mixture. In some embodiments, the triglycerides mixture includes between 5% and 45% lauric acid content, based on a total fatty acid content of the triglycerides mixture. In some embodiments, the triglycerides mixture includes between 5% and 35% lauric acid content, based on a total fatty acid content of the triglycerides mixture. In some embodiments, the triglycerides mixture includes between 5% and 25% lauric acid content, based on a total fatty acid content of the triglycerides mixture. In some embodiments, the triglycerides mixture includes between 5% and 15% lauric acid content, based on a total fatty acid content of the triglycerides mixture. In some embodiments, the triglycerides mixture includes between 15% and 45% lauric acid content, based on a total fatty acid content of the triglycerides mixture. In some embodiments, the triglycerides mixture includes between 25% and 35% lauric acid content, based on a total fatty acid content of the triglycerides mixture.

In other embodiments, the triglycerides mixture includes between 5% and 30% myristic acid content, based on a total fatty acid content of the triglycerides mixture. In other embodiments, the triglycerides mixture includes between 10% and 30% myristic acid content, based on a total fatty acid content of the triglycerides mixture. In other embodiments, the triglycerides mixture includes between 15% and 30% myristic acid content, based on a total fatty acid content of the triglycerides mixture. In other embodiments, the triglycerides mixture includes between 20% and 30% myristic acid content, based on a total fatty acid content of the triglycerides mixture. In other embodiments, the triglycerides mixture includes between 25% and 30% myristic acid content, based on a total fatty acid content of the triglycerides mixture.

In other embodiments, the triglycerides mixture includes between 2% and 25% myristic acid content, based on a total fatty acid content of the triglycerides mixture. In other embodiments, the triglycerides mixture includes between 2% and 20% myristic acid content, based on a total fatty acid content of the triglycerides mixture. In other embodiments, the triglycerides mixture includes between 2% and 15% myristic acid content, based on a total fatty acid content of the triglycerides mixture. In other embodiments, the triglycerides mixture includes between 2% and 10% myristic acid content, based on a total fatty acid content of the triglycerides mixture. In other embodiments, the triglycerides mixture includes between 2% and 5% myristic acid content, based on a total fatty acid content of the triglycerides mixture.

In other embodiments, the triglycerides mixture includes between 5% and 25% myristic acid content, based on a total fatty acid content of the triglycerides mixture. In other embodiments, the triglycerides mixture includes between 10% and 20% myristic acid content, based on a total fatty acid content of the triglycerides mixture.

In other embodiments, the triglycerides mixture includes between 6% and 45% palmitic acid content, based on a total fatty acid content of the triglycerides mixture. In other embodiments, the triglycerides mixture includes between 10% and 45% palmitic acid content, based on a total fatty acid content of the triglycerides mixture. In other embodiments, the triglycerides mixture includes between 20% and 45% palmitic acid content, based on a total fatty acid content of the triglycerides mixture. In other embodiments, the triglycerides mixture includes between 30% and 45% palmitic acid content, based on a total fatty acid content of the triglycerides mixture. In other embodiments, the triglycerides mixture includes between 40% and 45% palmitic acid content, based on a total fatty acid content of the triglycerides mixture.

In other embodiments, the triglycerides mixture includes between 6% and 40% palmitic acid content, based on a total fatty acid content of the triglycerides mixture. In other embodiments, the triglycerides mixture includes between 6% and 30% palmitic acid content, based on a total fatty acid content of the triglycerides mixture. In other embodiments, the triglycerides mixture includes between 6% and 20% palmitic acid content, based on a total fatty acid content of the triglycerides mixture. In other embodiments, the triglycerides mixture includes between 6% and 10% palmitic acid content, based on a total fatty acid content of the triglycerides mixture.

In other embodiments, the triglycerides mixture includes between 10% and 40% palmitic acid content, based on a total fatty acid content of the triglycerides mixture. In other embodiments, the triglycerides mixture includes between 20% and 30% palmitic acid content, based on a total fatty acid content of the triglycerides mixture.

In other embodiments, the triglycerides mixture includes between 2% and 25% stearic acid content, based on a total fatty acid content of the triglycerides mixture. In other embodiments, the triglycerides mixture includes between 5% and 25% stearic acid content, based on a total fatty acid content of the triglycerides mixture. In other embodiments, the triglycerides mixture includes between 10% and 25% stearic acid content, based on a total fatty acid content of the triglycerides mixture. In other embodiments, the triglycerides mixture includes between 15% and 25% stearic acid content, based on a total fatty acid content of the triglycerides mixture. In other embodiments, the triglycerides mixture includes between 20% and 25% stearic acid content, based on a total fatty acid content of the triglycerides mixture.

In other embodiments, the triglycerides mixture includes between 2% and 20% stearic acid content, based on a total fatty acid content of the triglycerides mixture. In other embodiments, the triglycerides mixture includes between 2% and 15% stearic acid content, based on a total fatty acid content of the triglycerides mixture. In other embodiments, the triglycerides mixture includes between 2% and 10% stearic acid content, based on a total fatty acid content of the triglycerides mixture.

In other embodiments, the triglycerides mixture includes between 5% and 20% stearic acid content, based on a total fatty acid content of the triglycerides mixture. In other embodiments, the triglycerides mixture includes between 10% and 15% stearic acid content, based on a total fatty acid content of the triglycerides mixture.

In embodiments, the triglycerides mixture includes between 15% and 45% oleic acid content, based on a total fatty acid content of the triglycerides mixture. In embodiments, the triglycerides mixture includes between 20% and 45% oleic acid content, based on a total fatty acid content of the triglycerides mixture. In embodiments, the triglycerides mixture includes between 25% and 45% oleic acid content, based on a total fatty acid content of the triglycerides mixture. In embodiments, the triglycerides mixture includes between 30% and 45% oleic acid content, based on a total fatty acid content of the triglycerides mixture. In embodiments, the triglycerides mixture includes between 35% and 45% oleic acid content, based on a total fatty acid content of the triglycerides mixture. In embodiments, the triglycerides mixture includes between 40% and 45% oleic acid content, based on a total fatty acid content of the triglycerides mixture.

In embodiments, the triglycerides mixture includes between 15% and 40% oleic acid content, based on a total fatty acid content of the triglycerides mixture. In embodiments, the triglycerides mixture includes between 15% and 35% oleic acid content, based on a total fatty acid content of the triglycerides mixture. In embodiments, the triglycerides mixture includes between 15% and 30% oleic acid content, based on a total fatty acid content of the triglycerides mixture. In embodiments, the triglycerides mixture includes between 15% and 25% oleic acid content, based on a total fatty acid content of the triglycerides mixture. In embodiments, the triglycerides mixture includes between 15% and 20% oleic acid content, based on a total fatty acid content of the triglycerides mixture.

In embodiments, the triglycerides mixture includes between 20% and 40% oleic acid content, based on a total fatty acid content of the triglycerides mixture.

In embodiments, the triglycerides mixture includes 15% or less linoleic acid content, based on a total fatty acid content of the triglycerides mixture. In embodiments, the triglycerides mixture includes 0.1% to 15% linoleic acid content, based on a total fatty acid content of the triglycerides mixture. In embodiments, the triglycerides mixture includes 1% to 15% linoleic acid content, based on a total fatty acid content of the triglycerides mixture. In embodiments, the triglycerides mixture includes 5% to 15% linoleic acid content, based on a total fatty acid content of the triglycerides mixture. In embodiments, the triglycerides mixture includes 10% to 15% linoleic acid content, based on a total fatty acid content of the triglycerides mixture. In embodiments, the triglycerides mixture includes 0.1% to 10% linoleic acid content, based on a total fatty acid content of the triglycerides mixture. In embodiments, the triglycerides mixture includes 0.1% to 5% linoleic acid content, based on a total fatty acid content of the triglycerides mixture. In embodiments, the triglycerides mixture includes 0.1% to 1% linoleic acid content, based on a total fatty acid content of the triglycerides mixture.

In embodiments, the triglycerides mixture includes 1% to 10% linoleic acid content, based on a total fatty acid content of the triglycerides mixture. In embodiments, the triglycerides mixture includes 0% linoleic acid content, based on a total fatty acid content of the triglycerides mixture.

In embodiments, the triglycerides mixture includes 10% or less linolenic acid content, based on a total fatty acid content of the triglycerides mixture. In embodiments, the triglycerides mixture includes 0.1% to 10% linolenic acid content, based on a total fatty acid content of the triglycerides mixture. In embodiments, the triglycerides mixture includes 1% to 10% linolenic acid content, based on a total fatty acid content of the triglycerides mixture. In embodiments, the triglycerides mixture includes 5% to 10% linolenic acid content, based on a total fatty acid content of the triglycerides mixture. In embodiments, the triglycerides mixture includes 0.1% to 8% linolenic acid content, based on a total fatty acid content of the triglycerides mixture. In embodiments, the triglycerides mixture includes 0.1% to 5% linolenic acid content, based on a total fatty acid content of the triglycerides mixture. In embodiments, the triglycerides mixture includes 0.1% to 1% linolenic acid content, based on a total fatty acid content of the triglycerides mixture.

In embodiments, the triglycerides mixture includes 1% to 8% linolenic acid content, based on a total fatty acid content of the triglycerides mixture. In embodiments, the triglycerides mixture includes 0% linolenic acid content, based on a total fatty acid content of the triglycerides mixture.

In embodiments, the triglycerides mixture includes 2% or less trans fatty acids, based on a total fatty acid content of the triglycerides mixture. In embodiments, the triglycerides mixture includes 0.1% to 2% trans fatty acids, based on a total fatty acid content of the triglycerides mixture. In embodiments, the triglycerides mixture includes 0.5% to 2% trans fatty acids, based on a total fatty acid content of the triglycerides mixture. In embodiments, the triglycerides mixture includes 1% to 2% trans fatty acids, based on a total fatty acid content of the triglycerides mixture. In embodiments, the triglycerides mixture includes 1.5% to 2% trans fatty acids, based on a total fatty acid content of the triglycerides mixture.

In embodiments, the triglycerides mixture includes 0.1% to 1.5% trans fatty acids, based on a total fatty acid content of the triglycerides mixture. In embodiments, the triglycerides mixture includes 0.1% to 1% trans fatty acids, based on a total fatty acid content of the triglycerides mixture. In embodiments, the triglycerides mixture includes 0.1% to 0.5% trans fatty acids, based on a total fatty acid content of the triglycerides mixture.

In embodiments, the triglycerides mixture includes 0.5% to 1% trans fatty acids, based on a total fatty acid content of the triglycerides mixture. In embodiments, the triglycerides mixture includes 0% trans fatty acids, based on a total fatty acid content of the triglycerides mixture.

In embodiments, the powder composition includes 15 weight % to 75 weight % of a salt mixture, based on the total weight of the powder composition. In embodiments, the powder composition includes 25 weight % to 75 weight % of a salt mixture, based on the total weight of the powder composition. In embodiments, the powder composition includes 35 weight % to 75 weight % of a salt mixture, based on the total weight of the powder composition. In embodiments, the powder composition includes 45 weight % to 75 weight % of a salt mixture, based on the total weight of the powder composition. In embodiments, the powder composition includes 55 weight % to 75 weight % of a salt mixture, based on the total weight of the powder composition. In embodiments, the powder composition includes 65 weight % to 75 weight % of a salt mixture, based on the total weight of the powder composition.

In embodiments, the powder composition includes 15 weight % to 65 weight % of a salt mixture, based on the total weight of the powder composition. In embodiments, the powder composition includes 15 weight % to 55 weight % of a salt mixture, based on the total weight of the powder composition. In embodiments, the powder composition includes 15 weight % to 45 weight % of a salt mixture, based on the total weight of the powder composition. In embodiments, the powder composition includes 15 weight % to 35 weight % of a salt mixture, based on the total weight of the powder composition. In embodiments, the powder composition includes 15 weight % to 25 weight % of a salt mixture, based on the total weight of the powder composition.

In embodiments, the powder composition includes 25 weight % to 65 weight % of a salt mixture, based on the total weight of the powder composition. In embodiments, the powder composition includes 35 weight % to 55 weight % of a salt mixture, based on the total weight of the powder composition.

In embodiments, the salt mixture includes at least 90 weight % sodium chloride, based on the total weight of the salt mixture. In embodiments, the salt mixture includes 90 weight % to 100 weight % sodium chloride, based on the total weight of the salt mixture. In embodiments, the salt mixture includes 92 weight % to 100 weight % sodium chloride, based on the total weight of the salt mixture. In embodiments, the salt mixture includes 95 weight % to 100 weight % sodium chloride, based on the total weight of the salt mixture. In embodiments, the salt mixture includes 97 weight % to 100 weight % sodium chloride, based on the total weight of the salt mixture.

In embodiments, the salt mixture includes 90 weight % to 97 weight % sodium chloride, based on the total weight of the salt mixture. In embodiments, the salt mixture includes 90 weight % to 95 weight % sodium chloride, based on the total weight of the salt mixture. In embodiments, the salt mixture includes 90 weight % to 92 weight % sodium chloride, based on the total weight of the salt mixture. In embodiments, the salt mixture includes 92 weight % to 97 weight % sodium chloride, based on the total weight of the salt mixture.

In embodiments, the salt mixture includes 0% to 20% of at least one of sodium citrate, disodium citrate, monosodium tartrate, or disodium tartrate, based on the total weight of the salt mixture. In embodiments, the salt mixture includes 0.1% to 20% of at least one of sodium citrate, disodium citrate, monosodium tartrate, or disodium tartrate, based on the total weight of the salt mixture. In embodiments, the salt mixture includes 5% to 20% of at least one of sodium citrate, disodium citrate, monosodium tartrate, or disodium tartrate, based on the total weight of the salt mixture. In embodiments, the salt mixture includes 10% to 20% of at least one of sodium citrate, disodium citrate, and, monosodium tartrate, or disodium tartrate, based on the total weight of the salt mixture. In embodiments, the salt mixture includes 15% to 20% of at least one of sodium citrate, disodium citrate, and, monosodium tartrate, or disodium tartrate, based on the total weight of the salt mixture.

In embodiments, the salt mixture includes 0% to 15% of at least one of sodium citrate, disodium citrate, and, monosodium tartrate, or disodium tartrate, based on the total weight of the salt mixture. In embodiments, the salt mixture includes 0.1% to 15% of at least one of sodium citrate, disodium citrate, and, monosodium tartrate, or disodium tartrate, based on the total weight of the salt mixture. In embodiments, the salt mixture includes 0.1% to 10% of at least one of sodium citrate, disodium citrate, monosodium tartrate, or disodium tartrate, based on the total weight of the salt mixture. In embodiments, the salt mixture includes 0.1% to 5% of at least one of sodium citrate, disodium citrate, monosodium tartrate, or disodium tartrate, based on the total weight of the salt mixture.

In embodiments, the salt mixture includes 0.1% to 15% of at least one of sodium citrate, disodium citrate, monosodium tartrate, or disodium tartrate, based on the total weight of the salt mixture. In embodiments, the salt mixture includes 5% to 10% of at least one of sodium citrate, disodium citrate, monosodium tartrate, or disodium tartrate, based on the total weight of the salt mixture.

In another embodiment, the powder composition also includes 5 weight % to 30 weight % of a polysaccharides mixture, based on the total weight of the powder composition. In another embodiment, the powder composition also includes 10 weight % to 30 weight % of a polysaccharides mixture, based on the total weight of the powder composition. In another embodiment, the powder composition also includes 15 weight % to 30 weight % of a polysaccharides mixture, based on the total weight of the powder composition. In another embodiment, the powder composition also includes 20 weight % to 30 weight % of a polysaccharides mixture, based on the total weight of the powder composition. In another embodiment, the powder composition also includes 25 weight % to 30 weight % of a polysaccharides mixture, based on the total weight of the powder composition.

In another embodiment, the powder composition also includes 5 weight % to 25 weight % of a polysaccharides mixture, based on the total weight of the powder composition. In another embodiment, the powder composition also includes 5 weight % to 20 weight % of a polysaccharides mixture, based on the total weight of the powder composition. In another embodiment, the powder composition also includes 5 weight % to 15 weight % of a polysaccharides mixture, based on the total weight of the powder composition. In another embodiment, the powder composition also includes 5 weight % to 10 weight % of a polysaccharides mixture, based on the total weight of the powder composition.

In another embodiment, the polysaccharides mixture includes 60 weight % to 99 weight % of maltodextrin of 20 dextrose equivalents, based a total weight of the polysaccharides mixture. In another embodiment, the polysaccharides mixture includes 70 weight % to 99 weight % of maltodextrin of 20 dextrose equivalents, based a total weight of the polysaccharides mixture. In another embodiment, the polysaccharides mixture includes 80 weight % to 99 weight % of maltodextrin of 20 dextrose equivalents, based a total weight of the polysaccharides mixture. In another embodiment, the polysaccharides mixture includes 90 weight % to 99 weight % of maltodextrin of 20 dextrose equivalents, based a total weight of the polysaccharides mixture.

In another embodiment, the polysaccharides mixture includes 50 weight % to 99 weight % of maltodextrin of 20 dextrose equivalents, based a total weight of the polysaccharides mixture. In another embodiment, the polysaccharides mixture includes 50 weight % to 90 weight % of maltodextrin of 20 dextrose equivalents, based a total weight of the polysaccharides mixture. In another embodiment, the polysaccharides mixture includes 50 weight % to 80 weight % of maltodextrin of 20 dextrose equivalents, based a total weight of the polysaccharides mixture. In another embodiment, the polysaccharides mixture includes 50 weight % to 70 weight % of maltodextrin of 20 dextrose equivalents, based a total weight of the polysaccharides mixture. In another embodiment, the polysaccharides mixture includes 50 weight % to 60 weight % of maltodextrin of 20 dextrose equivalents, based a total weight of the polysaccharides mixture.

In another embodiment, the polysaccharides mixture includes 60 weight % to 90 weight % of maltodextrin of 20 dextrose equivalents, based a total weight of the polysaccharides mixture. In another embodiment, the polysaccharides mixture includes 70 weight % to 80 weight % of maltodextrin of 20 dextrose equivalents, based a total weight of the polysaccharides mixture.

In another embodiment, the polysaccharides mixture includes 60 weight % to 99 weight % of maltodextrin of 10 dextrose equivalents, based a total weight of the polysaccharides mixture. In another embodiment, the polysaccharides mixture includes 70 weight % to 99 weight % of maltodextrin of 10 dextrose equivalents, based a total weight of the polysaccharides mixture. In another embodiment, the polysaccharides mixture includes 80 weight % to 99 weight % of maltodextrin of 10 dextrose equivalents, based a total weight of the polysaccharides mixture. In another embodiment, the polysaccharides mixture includes 90 weight % to 99 weight % of maltodextrin of 10 dextrose equivalents, based a total weight of the polysaccharides mixture.

In another embodiment, the polysaccharides mixture includes 50 weight % to 99 weight % of maltodextrin of 10 dextrose equivalents, based a total weight of the polysaccharides mixture. In another embodiment, the polysaccharides mixture includes 50 weight % to 90 weight % of maltodextrin of 10 dextrose equivalents, based a total weight of the polysaccharides mixture. In another embodiment, the polysaccharides mixture includes 50 weight % to 80 weight % of maltodextrin of 10 dextrose equivalents, based a total weight of the polysaccharides mixture. In another embodiment, the polysaccharides mixture includes 50 weight % to 70 weight % of maltodextrin of 10 dextrose equivalents, based a total weight of the polysaccharides mixture. In another embodiment, the polysaccharides mixture includes 50 weight % to 60 weight % of maltodextrin of 10 dextrose equivalents, based a total weight of the polysaccharides mixture.

In another embodiment, the polysaccharides mixture includes 60 weight % to 90 weight % of maltodextrin of 10 dextrose equivalents, based a total weight of the polysaccharides mixture. In another embodiment, the polysaccharides mixture includes 70 weight % to 80 weight % of maltodextrin of 10 dextrose equivalents, based a total weight of the polysaccharides mixture.

In another embodiment, the polysaccharides mixture includes 0 weight % to 30 weight % of glucose of 30 dextrose equivalents, based a total weight of the polysaccharides mixture. In another embodiment, the polysaccharides mixture includes 0.1 weight % to 30 weight % of glucose of 30 dextrose equivalents, based a total weight of the polysaccharides mixture. In another embodiment, the polysaccharides mixture includes 5 weight % to 30 weight % of glucose of 30 dextrose equivalents, based a total weight of the polysaccharides mixture. In another embodiment, the polysaccharides mixture includes 10 weight % to 30 weight % of glucose of 30 dextrose equivalents, based a total weight of the polysaccharides mixture. In another embodiment, the polysaccharides mixture includes 15 weight % to 30 weight % of glucose of 30 dextrose equivalents, based a total weight of the polysaccharides mixture. In another embodiment, the polysaccharides mixture includes 20 weight % to 30 weight % of glucose of 30 dextrose equivalents, based a total weight of the polysaccharides mixture. In another embodiment, the polysaccharides mixture includes 25 weight % to 30 weight % of glucose of 30 dextrose equivalents, based a total weight of the polysaccharides mixture.

In another embodiment, the polysaccharides mixture includes 0.1 weight % to 25 weight % of glucose of 30 dextrose equivalents, based a total weight of the polysaccharides mixture. In another embodiment, the polysaccharides mixture includes 0.1 weight % to 20 weight % of glucose of 30 dextrose equivalents, based a total weight of the polysaccharides mixture. In another embodiment, the polysaccharides mixture includes 0.1 weight % to 15 weight % of glucose of 30 dextrose equivalents, based a total weight of the polysaccharides mixture. In another embodiment, the polysaccharides mixture includes 0.1 weight % to 10 weight % of glucose of 30 dextrose equivalents, based a total weight of the polysaccharides mixture. In another embodiment, the polysaccharides mixture includes 0.1 weight % to 5 weight % of glucose of 30 dextrose equivalents, based a total weight of the polysaccharides mixture.

In another embodiment, the polysaccharides mixture includes 5 weight % to 20 weight % of glucose of 30 dextrose equivalents, based a total weight of the polysaccharides mixture. In another embodiment, the polysaccharides mixture includes 10 weight % to 15 weight % of glucose of 30 dextrose equivalents, based a total weight of the polysaccharides mixture.

In yet another embodiment, the polysaccharides mixture includes 0 weight % to 30 weight % of fructose polymers based a total weight of the polysaccharides mixture. In yet another embodiment, the polysaccharides mixture includes 0.1 weight % to 30 weight % of fructose polymers based a total weight of the polysaccharides mixture. In yet another embodiment, the polysaccharides mixture includes 5 weight % to 30 weight % of fructose polymers based a total weight of the polysaccharides mixture. In yet another embodiment, the polysaccharides mixture includes 10 weight % to 30 weight % of fructose polymers based a total weight of the polysaccharides mixture. In yet another embodiment, the polysaccharides mixture includes 15 weight % to 30 weight % of fructose polymers based a total weight of the polysaccharides mixture. In yet another embodiment, the polysaccharides mixture includes 20 weight % to 30 weight % of fructose polymers based a total weight of the polysaccharides mixture. In yet another embodiment, the polysaccharides mixture includes 25 weight % to 30 weight % of fructose polymers based a total weight of the polysaccharides mixture.

In yet another embodiment, the polysaccharides mixture includes 0.1 weight % to 25 weight % of fructose polymers based a total weight of the polysaccharides mixture. In yet another embodiment, the polysaccharides mixture includes 0.1 weight % to 20 weight % of fructose polymers based a total weight of the polysaccharides mixture. In yet another embodiment, the polysaccharides mixture includes 0.1 weight % to 15 weight % of fructose polymers based a total weight of the polysaccharides mixture. In yet another embodiment, the polysaccharides mixture includes 0.1 weight % to 10 weight % of fructose polymers based a total weight of the polysaccharides mixture. In yet another embodiment, the polysaccharides mixture includes 0.1 weight % to 5 weight % of fructose polymers based a total weight of the polysaccharides mixture.

In yet another embodiment, the polysaccharides mixture includes 5 weight % to 25 weight % of fructose polymers based a total weight of the polysaccharides mixture. In yet another embodiment, the polysaccharides mixture includes 10 weight % to 20 weight % of fructose polymers based a total weight of the polysaccharides mixture. In yet another embodiment, the polysaccharides mixture includes 0 weight % fructose polymers based a total weight of the polysaccharides mixture.

In embodiments, the fructose polymers include at least one of inulin, oligofructose or polydextrose.

In other embodiments, the powder composition includes 0 weight % to 25 weight % of a protein mixture, based a total weight of the powder composition. In other embodiments, the powder composition includes 0.1 weight % to 25 weight % of a protein mixture, based a total weight of the powder composition. In other embodiments, the powder composition includes 5 weight % to 25 weight % of a protein mixture, based a total weight of the powder composition. In other embodiments, the powder composition includes 10 weight % to 25 weight % of a protein mixture, based a total weight of the powder composition. In other embodiments, the powder composition includes 15 weight % to 25 weight % of a protein mixture, based a total weight of the powder composition. In other embodiments, the powder composition includes 20 weight % to 25 weight % of a protein mixture, based a total weight of the powder composition.

In other embodiments, the powder composition includes 0.1 weight % to 20 weight % of a protein mixture, based a total weight of the powder composition. In other embodiments, the powder composition includes 0.1 weight % to 15 weight % of a protein mixture, based a total weight of the powder composition. In other embodiments, the powder composition includes 0.1 weight % to 10 weight % of a protein mixture, based a total weight of the powder composition. In other embodiments, the powder composition includes 0.1 weight % to 5 weight % of a protein mixture, based a total weight of the powder composition.

In other embodiments, the powder composition includes 5 weight % to 20 weight % of a protein mixture, based a total weight of the powder composition. In other embodiments, the powder composition includes 10 weight % to 15 weight % of a protein mixture, based a total weight of the powder composition.

In an embodiment, the protein mixture includes at least one of vegetable proteins or animal proteins.

In embodiments, the protein mixture includes at least one of sodium caseinate, calcium caseinate, soybean concentrate protein, albumin concentrate protein, or bovine serum concentrate protein.

In embodiments, the protein mixture includes 80 weight % to 100 weight % of sodium caseinate and/or calcium caseinate, based on a total weight of the protein mixture, 0.1 weight % to 15 weight % of the soybean concentrate protein, based on the total weight of the protein mixture, 0.1 weight % to 15 weight % of the albumin concentrate protein, based on the total weight of the protein mixture, and 0.1 weight % to 10 weight % of the bovine serum concentrate protein, based on the total weight of the protein mixture.

In embodiments, the protein mixture includes 80 weight % to 99 weight % of sodium caseinate and/or calcium caseinate, based on a total weight of the protein mixture. In embodiments, the protein mixture includes 80 weight % to 90 weight % of sodium caseinate and/or calcium caseinate, based on a total weight of the protein mixture. In embodiments, the protein mixture includes 85 weight % to 100 weight % of sodium caseinate and/or calcium caseinate, based on a total weight of the protein mixture. In embodiments, the protein mixture includes 90 weight % to 100 weight % of sodium caseinate and/or calcium caseinate, based on a total weight of the protein mixture. In embodiments, the protein mixture includes 95 weight % to 100 weight % of sodium caseinate and calcium caseinate, based on a total weight of the protein mixture.

In embodiments, the protein mixture includes 85 weight % to 99 weight % of sodium caseinate and/or calcium caseinate, based on a total weight of the protein mixture. In embodiments, the protein mixture includes 90 weight % to 99 weight % of sodium caseinate and/or calcium caseinate, based on a total weight of the protein mixture. In embodiments, the protein mixture includes 95 weight % to 99 weight % of sodium caseinate and/or calcium caseinate, based on a total weight of the protein mixture.

As used herein, the weight percent of "sodium caseinate and/or calcium caseinate" corresponds to the weight percent of the total caseinate present in the composition. Thus, if only sodium caseinate is present, the weight present corresponds to the weight percent of sodium caseinate. If only calcium caseinate is present, the weigh percent corresponds to the weight percent of calcium caseinate. If both sodium caseinate and calcium caseinate are present, the weight percent corresponds to the total weight percent of the sodium caseinate and the calcium caseinate.

In embodiments, the protein mixture includes 0 weight % to 15 weight % of soybean concentrate protein, based on a total weight of the protein mixture. In embodiments, the protein mixture includes 0.1 weight % to 15 weight % of soybean concentrate protein, based on the total weight of the protein mixture. In embodiments, the protein mixture includes 5 weight % to 15 weight % of soybean concentrate protein, based on a total weight of the protein mixture. In embodiments, the protein mixture includes 10 weight % to 15 weight % of soybean concentrate protein, based on a total weight of the protein mixture.

In embodiments, the protein mixture includes 0.1 weight % to 10 weight % of soybean concentrate protein, based on a total weight of the protein mixture. In embodiments, the protein mixture includes 0.1 weight % to 5 weight % of soybean concentrate protein, based on a total weight of the protein mixture.

In embodiments, the protein mixture includes 0.1 weight % to 10 weight % of soybean concentrate protein, based on a total weight of the protein mixture.

In embodiments, the protein mixture includes 0 weight % to 15 weight % of albumin concentrate protein, based on a total weight of the protein mixture. In embodiments, the protein mixture includes 0.1 weight % to 15 weight % of albumin concentrate protein, based on a total weight of the protein mixture. In embodiments, the protein mixture includes 5 weight % to 15 weight % of albumin concentrate protein, based on a total weight of the protein mixture. In embodiments, the protein mixture includes 10 weight % to 15 weight % of albumin concentrate protein, based on a total weight of the protein mixture.

In embodiments, the protein mixture includes 0.1 weight % to 10 weight % of albumin concentrate protein, based on a total weight of the protein mixture. In embodiments, the protein mixture includes 0.1 weight % to 5 weight % of albumin concentrate protein, based on a total weight of the protein mixture.

In embodiments, the protein mixture includes 0.1 weight % to 10 weight % of albumin concentrate protein, based on a total weight of the protein mixture.

In embodiments, the protein mixture includes 0 weight % to 10 weight % of bovine serum concentrate protein, based on a total weight of the protein mixture. In embodiments, the protein mixture includes 0.1 weight % to 10 weight % of bovine serum concentrate protein, based on a total weight of the protein mixture. In embodiments, the protein mixture includes 5 weight % to 10 weight % of bovine serum concentrate protein, based on a total weight of the protein mixture.

In embodiments, the protein mixture includes 0.1 weight % to 10 weight % of bovine serum concentrate protein, based on a total weight of the protein mixture. In embodiments, the protein mixture includes 0.1 weight % to 5 weight % of bovine serum concentrate protein, based on a total weight of the protein mixture.

In other embodiments, the powder composition includes 0 weight % to 10 weight % of an emulsifier, based on the total weight of the powder composition. In other embodiments, the powder composition includes 0.1 weight % to 10 weight % of an emulsifier, based on the total weight of the powder composition. In other embodiments, the powder composition includes 1 weight % to 10 weight % of an emulsifier, based on the total weight of the powder composition. In other embodiments, the powder composition includes 5 weight % to 10 weight % of an emulsifier, based on the total weight of the powder composition.

In other embodiments, the powder composition includes 0.1 weight % to 5 weight % of an emulsifier, based on the total weight of the powder composition. In other embodiments, the powder composition includes 0.1 weight % to 1 weight % of an emulsifier, based on the total weight of the powder composition. In other embodiments, the powder composition includes 0.1 weight % to 5 weight % of an emulsifier, based on the total weight of the powder composition.

In other embodiments the emulsifier includes at least one of polysorbates, diacetyl tartaric esters, sorbitan esters, vegetable fatty acid esters and polyesters, ricinoleic acid esters and polyesters, lactic acid esters and polyesters, citric acid esters and polyesters, acetic acid esters and polyesters, monoglycerides and diglycerides of fatty acids, or lecithin.

In yet other embodiments, the powder composition includes 0 weight % to 10 weight % of a flavor mixture, based on the total weight of the powder composition. In embodiments, the powder composition includes 0.1 weight % to 10 weight % of a flavor mixture, based on the total weight of the powder composition. In embodiments, the powder composition includes 1 weight % to 10 weight % of a flavor mixture, based on the total weight of the powder composition. In embodiments, the powder composition includes 5 weight % to 10 weight % of a flavor mixture, based on the total weight of the powder composition.

In embodiments, the powder composition includes 0.1 weight % to 5 weight % of a flavor mixture, based on the total weight of the powder composition. In embodiments, the powder composition includes 0.1 weight % to 1 weight % of a flavor mixture, based on the total weight of the powder composition.

In embodiments, the flavor mixture includes at least one of vegetable species, salt, fruits, spicy/hot tastes, cheese, caramel, butter, or sweet tastes.

In yet other embodiments, the powder composition includes 0 weight % to 10 weight % of a color mixture, based on the total weight of the powder composition. In embodiments, the powder composition includes 0.1 weight % to 10 weight % of a color mixture, based on the total weight of the powder composition. In embodiments, the powder composition includes 1 weight % to 10 weight % of a color mixture, based on the total weight of the powder composition. In embodiments, the powder composition includes 5 weight % to 10 weight % of a color mixture, based on the total weight of the powder composition.

In embodiments, the powder composition includes 0.1 weight % to 5 weight % of a color mixture, based on the total weight of the powder composition. In embodiments, the powder composition includes 0.1 weight % to 1 weight % of a color mixture, based on the total weight of the powder composition.

In embodiments, the color mixture selected of the group of yellow, orange, red, blue, green, violet, brown, or caramel.

In yet another embodiment, the powder composition includes 0 weight % to 5 weight % of at least one of antioxidants or preservatives, based on the total weight of the powder composition. In the embodiment, the powder composition includes 0.01 weight % to 5 weight % of at least one of antioxidants or preservatives, based on the total weight of the powder composition. In the embodiment, the powder composition includes 1 weight % to 5 weight % of at least one of antioxidants or preservatives, based on the total weight of the powder composition. In the embodiment, the powder composition includes 3 weight % to 5 weight % of at least one of antioxidants or preservatives, based on the total weight of the powder composition.

In the embodiment, the powder composition includes 0.01 weight % to 3 weight % of at least one of antioxidants or preservatives, based on the total weight of the powder composition. In the embodiment, the powder composition includes 0.01 weight % to 1 weight % of at least one of antioxidants or preservatives, based on the total weight of the powder composition.

In the embodiment, the powder composition includes 1 weight % to 3 weight % of at least one of antioxidants or preservatives, based on the total weight of the powder composition.

In embodiments, the at least one of the antioxidants or the preservatives includes at least one of TBHQ, BHT, ascorbil palmitate, propyl gallate, citric acid, tocopherols, tocotrienols, hidroxitiroxsol, resveratrol, or rosemary extract.

In embodiments, the powder composition comprises 0 weight % to 3 weight % of anticaking agents, based on the total weight of the powder composition. In embodiments, the powder composition comprises 0.01 weight % to 3 weight % of anticaking agents, based on the total weight of the powder composition. In embodiments, the powder composition comprises 0.1 weight % to 3 weight % of anticaking agents, based on the total weight of the powder composition. In embodiments, the powder composition comprises 0.5 weight % to 3 weight % of anticaking agents, based on the total weight of the powder composition. In embodiments, the powder composition comprises 1 weight % to 3 weight % of anticaking agents, based on the total weight of the powder composition. In embodiments, the powder composition comprises 2 weight % to 3 weight % of anticaking agents, based on the total weight of the powder composition.

In embodiments, the powder composition comprises 0.01 weight % to 2 weight % of anticaking agents, based on the total weight of the powder composition. In embodiments, the powder composition comprises 0.01 weight % to 1 weight % of anticaking agents, based on the total weight of the powder composition. In embodiments, the powder composition comprises 0.01 weight % to 0.5 weight % of anticaking agents, based on the total weight of the powder composition.

In embodiments, the powder composition comprises 0.5 weight % to 2 weight % of anticaking agents, based on the total weight of the powder composition.

In some embodiment, the anticaking agents include at least one of silica dioxide, tricalcic phosphate, or calcium silicate.

In embodiments, a sodium content of the powder composition is 5 weight % to 30 weight %, based on the total weight of the powder composition. In embodiments, a sodium content of the powder composition is 10 weight % to 30 weight %, based on the total weight of the powder composition. In embodiments, a sodium content of the powder composition is 15 weight % to 30 weight %, based on the total weight of the powder composition. In embodiments, a sodium content of the powder composition is 20 weight % to 30 weight %, based on the total weight of the powder composition. In embodiments, a sodium content of the powder composition is 25 weight % to 30 weight %, based on the total weight of the powder composition.

In embodiments, a sodium content of the powder composition is 5 weight % to 25 weight %, based on the total weight of the powder composition. In embodiments, a sodium content of the powder composition is 5 weight % to 20 weight %, based on the total weight of the powder composition. In embodiments, a sodium content of the powder composition is 5 weight % to 15 weight %, based on the total weight of the powder composition. In embodiments, a sodium content of the powder composition is 5 weight % to 10 weight %, based on the total weight of the powder composition.

In embodiments, a moisture content of the powder composition is 0 weight % to 2 weight %, based on the total weight of the powder composition. In embodiments a moisture content of the powder composition is 0.1 weight % to 2 weight %, based on the total weight of the powder composition. In embodiments a moisture content of the powder composition is 0.5 weight % to 2 weight %, based on the total weight of the powder composition. In embodiments a moisture content of the powder composition is 1 weight % to 2 weight %, based on the total weight of the powder composition. In embodiments a moisture content of the powder composition is 1.5 weight % to 2 weight %, based on the total weight of the powder composition.

In embodiments a moisture content of the powder composition is 0 weight % to 2 weight %, based on the total weight of the powder composition. In embodiments a moisture content of the powder composition is 0.1 weight % to 1.5 weight %, based on the total weight of the powder composition. In embodiments a moisture content of the powder composition is 0.1 weight % to 1 weight %, based on the total weight of the powder composition. In embodiments a moisture content of the powder composition is 0.1 weight % to 0.5 weight %, based on the total weight of the powder composition.

In embodiments, a particle size of the powder is in the range of 400 microns to 1200 microns. In embodiments, a particle size of the powder is in the range of 500 microns to 1200 microns. In embodiments, a particle size of the powder is in the range of 600 microns to 1200 microns. In embodiments, a particle size of the powder is in the range of 700 microns to 1200 microns. In embodiments, a particle size of the powder is in the range of 800 microns to 1200 microns. In embodiments, a particle size of the powder is in the range of 900 microns to 1200 microns. In embodiments, a particle size of the powder is in the range of 1000 microns to 1200 microns. In embodiments, a particle size of the powder is in the range of 1100 microns to 1200 microns.

In embodiments, a particle size of the powder is in the range of 400 microns to 1100 microns. In embodiments, a particle size of the powder is in the range of 400 microns to 1000 microns. In embodiments, a particle size of the powder is in the range of 400 microns to 900 microns. In embodiments, a particle size of the powder is in the range of 400 microns to 800 microns. In embodiments, a particle size of the powder is in the range of 400 microns to 700 microns. In embodiments, a particle size of the powder is in the range of 400 microns to 600 microns. In embodiments, a particle size of the powder is in the range of 400 microns to 500 microns.

In embodiments, a particle size of the powder is in the range of 500 microns to 1100 microns. In embodiments, a particle size of the powder is in the range of 600 microns to 1000 microns. In embodiments, a particle size of the powder is in the range of 700 microns to 900 microns.

In some embodiments, the triglyceride mixture may be produced from at least one of palm oil and/or its fractions, palm kernel oil and/or its fractions, coconut oil and/or its fractions, soybean oil, rapeseed oil, canola oil, sunflower oil or the high oleic versions of these oils.

In yet other embodiments, the sodium content of the powder composition compared with a standard sodium chloride salt is around 15% to 70% less.

In some embodiments, the powder composition is manufactured using an emulsion. In embodiments, the emulsion is an oil/water emulsion. In other embodiments, the emulsion is a water/oil emulsion.

In an embodiment, the method includes dissolving the salt mixture in water in a range of 1:5 to 1:3 at a temperature between 40 degrees C. and 75 degrees C. to form a water phase. In the embodiment, the method further includes adding the polysaccharides mixture to the water phase in a range of 1:25 to 1:100 at a temperature between 40 degrees C. and 75 degrees C. In the embodiment, the method further includes adding the protein mixture to the water phase in a range of 1:25 to 1:150 at a temperature between 40 degrees C. and 75 degrees C. In the embodiment, the method includes adding the flavors, colors, antioxidants and preservatives to the water phase at a temperature between 40 degrees C. and 75 degrees C. to form the water phase A.

In the embodiment, the method next includes dissolving the emulsifier in the triglycerides mixture in a relation range of 1:100 to 1:30 at a temperature between 40 degrees C. and 75 degrees C. to form fatty phase B. In the embodiment, the method further includes adding the fatty phase B to the water phase A, agitating the combination around 50 to 3000 rpm in a tank at a temperature between 40 degrees C. and 75 degrees C. for at least 10 minutes to form an emulsion C.

In the embodiment, the method includes homogenizing the emulsion C in a homogenizer. In embodiments, the homogenizer includes pistons. In embodiments, the homogenization step is conducted with two pressure steps. In the embodiments, the first pressure step is conducted at a pressure of 800 psi to 3,000 psi. In the embodiments, the second pressure step may be conducted at pressure of 120 psi to 1,500 psi to form a homogenized emulsion D.

In the embodiment, the method next includes drying the homogenized emulsion D in a spray dryer or equivalent. In the embodiment, the spray dryer has an internal temperature in the chamber from 180 degrees C. to 280 degrees C. and an outlet temperature from 50 degrees C. to 120 degrees C. to produce a powder E having a moisture content of 2% or less.

In the embodiment, the method further includes sieving the powder E with a mesh range from 16-40 mesh number to achieve a particle size of about 400 microns to 1200 microns.

In the embodiment, the method further includes adding the anticaking agents from 0 to 3%, based on a total weight of the powder E.

In the embodiment, the method further includes packing the final powder E in a paper bag, cardboard box with internal plastic bag, or equivalent.

In yet another embodiment, the present invention includes a mixture comprising 1 weight % to 99 weight % of the powder composition detailed herein and the remainder sodium chloride. In yet another embodiment, the present invention includes a mixture comprising 1 weight % to 90 weight % of the powder composition detailed herein and the remainder sodium chloride. In yet another embodiment, the present invention includes a mixture comprising 1 weight % to 80 weight % of the powder composition detailed herein and the remainder sodium chloride. In yet another embodiment, the present invention includes a mixture comprising 1 weight % to 70 weight % of the powder composition detailed herein and the remainder sodium chloride. In yet another embodiment, the present invention includes a mixture comprising 1 weight % to 60 weight % of the powder composition detailed herein and the remainder sodium chloride. In yet another embodiment, the present invention includes a mixture comprising 1 weight % to 50 weight % of the powder composition detailed herein and the remainder sodium chloride. In yet another embodiment, the present invention includes a mixture comprising 1 weight % to 40 weight % of the powder composition detailed herein and the remainder sodium chloride. In yet another embodiment, the present invention includes a mixture comprising 1 weight % to 30 weight % of the powder composition detailed herein and the remainder sodium chloride. In yet another embodiment, the present invention includes a mixture comprising 1 weight % to 20 weight % of the powder composition detailed herein and the remainder sodium chloride. In yet another embodiment, the present invention includes a mixture comprising 1 weight % to 10 weight % of the powder composition detailed herein and the remainder sodium chloride.

In yet another embodiment, the present invention includes a mixture comprising 10 weight % to 99 weight % of the powder composition detailed herein and the remainder sodium chloride. In yet another embodiment, the present invention includes a mixture comprising 20 weight % to 99 weight % of the powder composition detailed herein and the remainder sodium chloride. In yet another embodiment, the present invention includes a mixture comprising 30 weight % to 99 weight % of the powder composition detailed herein and the remainder sodium chloride. In yet another embodiment, the present invention includes a mixture comprising 40 weight % to 99 weight % of the powder composition detailed herein and the remainder sodium chloride. In yet another embodiment, the present invention includes a mixture comprising 50 weight % to 99 weight % of the powder composition detailed herein and the remainder sodium chloride. In yet another embodiment, the present invention includes a mixture comprising 60 weight % to 99 weight % of the powder composition detailed herein and the remainder sodium chloride. In yet another embodiment, the present invention includes a mixture comprising 70 weight % to 99 weight % of the powder composition detailed herein and the remainder sodium chloride. In yet another embodiment, the present invention includes a mixture comprising 80 weight % to 99 weight % of the powder composition detailed herein and the remainder sodium chloride. In yet another embodiment, the present invention includes a mixture comprising 90 weight % to 99 weight % of the powder composition detailed herein and the remainder sodium chloride.

In yet another embodiment, the present invention includes a mixture comprising 10 weight % to 90 weight % of the powder composition detailed herein and the remainder sodium chloride. In yet another embodiment, the present invention includes a mixture comprising 20 weight % to 80 weight % of the powder composition detailed herein and the remainder sodium chloride. In yet another embodiment, the present invention includes a mixture comprising 30 weight % to 70 weight % of the powder composition detailed herein and the remainder sodium chloride. In yet another embodiment, the present invention includes a mixture comprising 40 weight % to 60 weight % of the powder composition detailed herein and the remainder sodium chloride.

Non-Limiting Examples

The following examples are intended to illustrate the invention and should not be construed as limiting the invention in any way.

Composition 1

An emulsion of a lipid in water (oil/water emulsion) was prepared according to the formulation shown in Table 1:

TABLE 1

| Formulation | Emulsion, weight % |
|---|---|
| Lipids (triglyceride mixture) | 10.7 |
| NaCl (sodium chloride) - (sodium salt) | 8.7 |
| Maltodextrin (polysaccharides mixture) | 1.7 |
| Sodium caseinate (protein mixture) | 1.6 |
| Mono-diglycerides (emulsifiers) | 0.2 |
| Water | 77.1 |
| Sodium citrate (sodium salt) | 0.06 |
| Total: | 100.0 |

The triglycerides mixture was produced from palm kernel oil and its fractions as detailed in Tables 2 and 3:

TABLE 2

| Triglycerides Mixture | Composition |
|---|---|
| Palm kernel olein (iodine value - 23) | 80% |
| Palm kernel oil (iodine value - 18) | 20% |

TABLE 3

| Fatty acids | Triglycerides Mixture (%) |
|---|---|
| Caproic (C6:0) | 0.2 |
| Caprylic (C8:0) | 3.4 |
| Capric (CI 0:0) | 3.2 |
| Lauric (C12:0) | 42.4 |
| Mirystic(CI 4:0) | 13.8 |
| Palmitic (C16:0) | 9.4 |
| Stearic (C18:0) | 2.8 |
| Oleic (C18:In9c) | 20.9 |
| Linoleic (C18:2n6c) | 3.3 |
| Linolenic (C18:3n3) | 0.0 |

The emulsion was pasteurized at 75 degrees C. to 80 degrees C. for 15 minutes and then homogenized at a two-step pressure of 1800 psi and 500 psi. The emulsion was then dried in a spray drying tower at a chamber temperature 220 degrees C. to 230 degrees C. and an output temperature in the dried product of 80 degrees C. to 90 degrees C.

A powder product with the following composition was obtained after spray drying the emulsion detailed above:

TABLE 4

| Ingredients | Dried Powder (weight %) |
|---|---|
| Triglycerides mixture | 46% |
| NaCl (sodium chloride) - (sodium salt) | 37.6% |
| Maltodextrin - (polysaccharides mixture) | 7.4% |
| Sodium caseinate - (protein mixture) | 6.8% |
| MonoDiglycerides - (emulsifier) | 1.1% |
| Water | 1.2% |
| Sodium citrate (sodium salt) | 0.3% |
| Silica dioxide (anticaking agent) | 0.2% |

TABLE 5

| Physiochemical Parameters | Weight % or (Value) |
|---|---|
| % Fats | 45 |
| % Proteins | 5.9 |
| % Sodium | 16 |
| % Moisture | 1.2 |
| Particle size, mesh 30 (595 microns) | (90%) |
| Density, grams/ml | (0.49) |

The percentage of sodium content reduction compared to standard salt (sodium chloride) is shown in Table 6:

TABLE 6

| | Sodium Content (weight %) |
|---|---|
| Standard Salt | 39.6% |
| Powder composition 1 | 16% |
| % of Reduction | 59.6% |

Composition 2

An emulsion of a lipid in water (oil/water emulsion) was prepared according to the formulation shown in Table 7:

TABLE 7

| Formulation | Emulsion, weight % |
|---|---|
| Lipids (triglyceride mixture) | 8.6 |
| NaCl (sodium chloride)- (sodium salt) | 10.7 |
| Maltodextrin (polysaccharides mixture) | 1.7 |
| Sodium caseinate (protein mixture) | 0.8 |
| Mono-diglycerides (emulsifiers) | 0.2 |
| Water | 77.9 |
| Sodium citrate (sodium salt) | 0.06 |
| Total: | 100.0 |

The triglycerides mixture was produced from palm kernel oil and its fractions as detailed in Tables 8 and 9.

TABLE 8

| Triglycerides mixture | Composition |
|---|---|
| Palm kernel olein (iodine value-23) | 80% |
| Palm kernel oil (iodine value-18) | 20% |

TABLE 9

| Fatty acids | Triglycerides Mixture (%) |
|---|---|
| Caproic (C6:0) | 0.2 |
| Caprylic (C8:0) | 3.4 |
| Capric (Cl 0:0) | 3.2 |
| Lauric (C12:0) | 42.4 |
| Mirystic(Cl 4:0) | 13.8 |
| Palmitic (C16:0) | 9.4 |
| Stearic (C18:0) | 2.8 |
| Oleic (C18:In9c) | 20.9 |
| Linoleic (C18:2n6c) | 3.3 |
| Linolenic (C18:3n3) | 0.0 |

The emulsion was pasteurized at 75 degrees C. to 80 degrees C. for 15 minutes and then homogenized at a two-step pressure of 1800 psi and 500 psi. The emulsion was then dried in a spray drying tower at a chamber temperature 220 degrees C. to 230 degrees C. and an output temperature in the dried product of 80 degrees C. to 90 degrees C.

A powder product with the following composition was obtained after spray drying the emulsion detailed above:

TABLE 10

| Ingredients | Dried Powder (weight %) |
|---|---|
| Triglycerides mixture | 38.8% |
| NaCl (sodium chloride)-(sodium salt) | 47.8% |
| Maltodextrin-(polysaccharides mixture) | 7.6% |
| Sodium caseinate-(protein mixture) | 3.6% |
| MonoDiglycerides-(emulsifiers) | 0.8% |
| Water | 1% |
| Sodium citrate (sodium salt) | 0.3% |
| Silica dioxide (anticaking agent) | 0.2% |

TABLE 11

| Physiochemical Parameters | Weight % or (Value) |
|---|---|
| % Fats | 35 |
| % Proteins | 3.5 |
| % Sodium | 21 |
| % Moisture | 0.85 |
| Particle size, mesh 30 (595 microns) | (88%) |
| Density, grams/ml | (0.58) |

The percentage of sodium content reduction compared to standard salt (sodium chloride) is shown in Table 12:

TABLE 12

| | Sodium Content (weight %) |
|---|---|
| Standard Salt | 39.6 |
| Powder composition 2 | 21 |
| % of Reduction | 47 |

Composition 3

An emulsion of a lipid in water (oil/water emulsion) was prepared according to the formulation shown in Table 13:

TABLE 13

| Formulation | Emulsion, weight % |
|---|---|
| Lipids (triglyceride mixture) | 6-14 |
| NaCl (sodium chloride) + sodium citrate (salts mixture) | 7-15 |
| Maltodextrin (polysaccharides mixture) | 1-5 |
| Sodium caseinate (protein mixture) | 1-6 |
| Mono-diglycerides (emulsifiers) | 1 max |
| Water | 60-80 |
| Total: | 100.0 |

The triglycerides mixture was produced from palm kernel oil and its fractions as detailed in Tables 14 and 15:

TABLE 14

| Triglycerides mixture | Composition |
|---|---|
| Palm kernel olein (iodine value - 23) | 70-100% |
| Palm kernel oil (iodine value - 18) | 0-30%% |

TABLE 15

| Fatty acids | Triglycerides Mixture (%) |
|---|---|
| Caproic (C6:0) | 0.7 max |
| Caprylic (C8:0) | 6 max |
| Capric (Cl 0:0) | 5 max |
| Lauric (C12:0) | 25-50 |
| Mirystic(Cl 4:0) | 10-30 |
| Palmitic (C16:0) | 6-16 |

TABLE 15-continued

| Fatty acids | Triglycerides Mixture (%) |
|---|---|
| Stearic (C18:0) | 10 max |
| Oleic (C18:1n9c) | 10-40 |
| Linoleic (C18:2n6c) | 10 max |
| Linolenic (C18:3n3) | 8 max |

A powder product with the following composition obtained from the spray drying process described for Compositions 1 and 2:

TABLE 16

| Ingredients | Dried Powder (weight %) |
|---|---|
| Triglycerides mixture | 30-60% |
| NaCl (sodium chloride)-(sodium salt) | 30-60% |
| Maltodextrin-(polysaccharides mixture) | 4-20% |
| Sodium caseinate-(protein mixture) | 15% max |
| MonoDiglycerides-(emulsifier) | 3% max |
| Water | 3% max |
| Sodium citrate (sodium salt) | 1.5% max |

TABLE 17

| Physiochemical Parameters | Weight % or (Value) |
|---|---|
| % Fats | 30-60 |
| % Proteins | 10 max |
| % Sodium | 10-35 |
| % Moisture | 3 max |
| Particle size | Mesh 19-40 (400-1200 microns) |
| Density, grams/ml | (0.4-0.7) |

The percentage of sodium content reduction compared to standard salt (sodium chloride) is shown in Table 18:

TABLE 18

| Sodium reduction | Value, % |
|---|---|
| % of sodium reduction | 30-60% |

Examples Using Compositions 1-2 for Sensory Panel

Example 1

The compositions 1 and 2 were used to prepare an oil slurry with dispersed salt to cover extruded snacks in order to test the salt flavor in a sensory panel according the following conditions:

Oil slurry composition: 90% palm oil+10% salt system

Temperature of the salt in oil slurry: 42-46 degrees C.

Snack weight before slurry application: 0.4-0.5 grams

Snack weight after the slurry application: 0.8-0.9 grams

Crystallization time and storage: 24-48 hours

Sensory Panel: 7 people minimum to taste the salty flavor of the snacks and provides scores from 1 to 5 as maximum.

Figure 1:
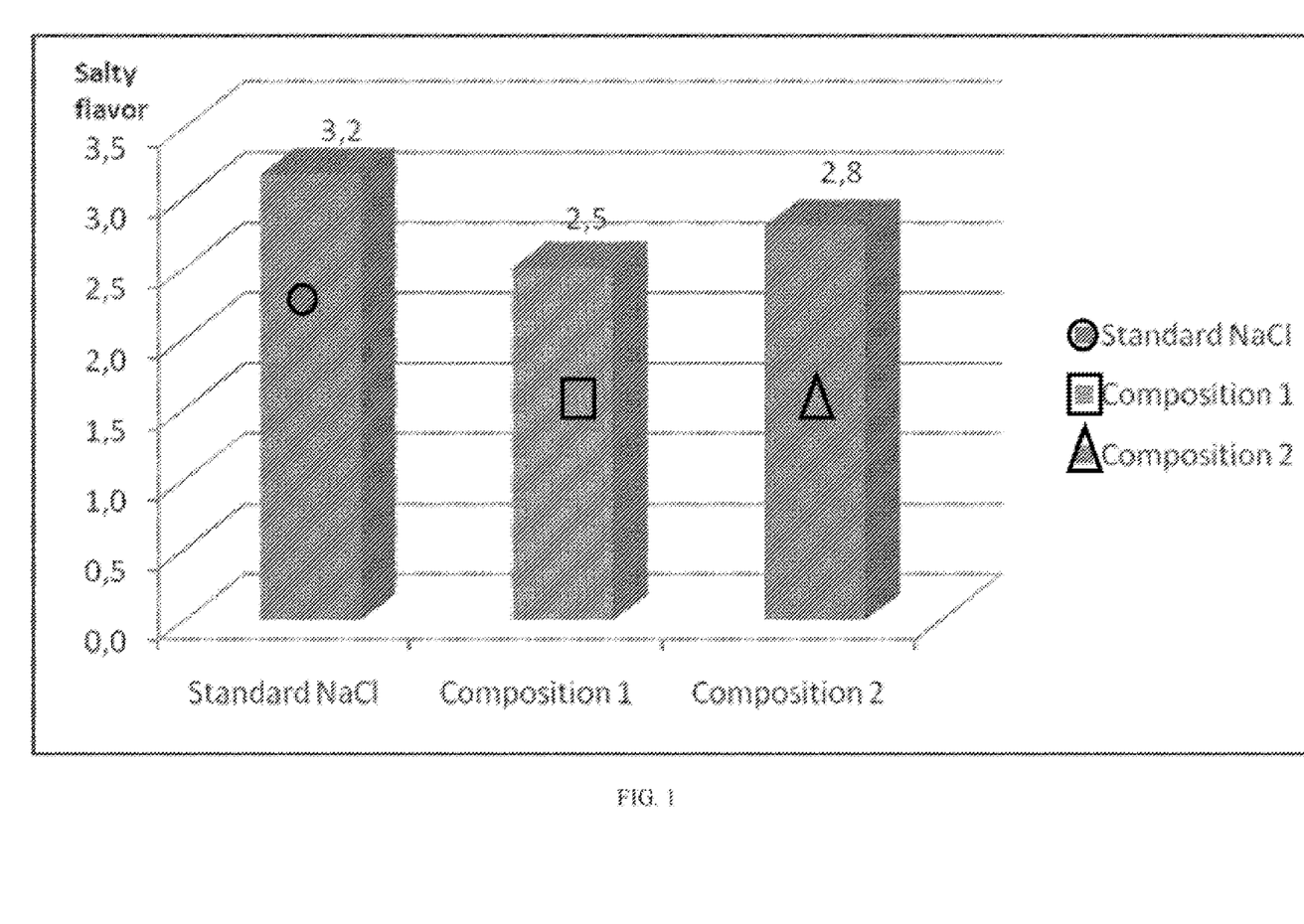
FIG. 1 shows sensory panel results of non-limiting examples of the present invention.

The results are shown in FIG. 1. As shown in FIG. 1, the salty flavor of compositions 1 and 2 were similar to the standard salt flavor despite the reduced sodium content of composition 1 (59% reduction) and composition 2 (47% reduction).

Example 2

Composition 1 was mixed with standard salt in order to reduce 30% of sodium in fried potato chips according the following conditions:

TABLE 19

| Composition 1 | 50% |
|---|---|
| Standard salt | 50% |
| % sodium reduction | 30% |

Weight range of the potato chips: 1.5-2.4 grams

Percentage of the salt system with 30% of sodium reduction sprayed directly on the chip surface: 1.3%

Temperature of the potato chips: 40 degrees C. to 60 degrees C.

Crystallization/resting time and storage: 24 to 48 hours

Sensory Panel: 7 people minimum to taste the salty flavor of the snacks and provide scores from 1 to 5 as maximum.

Figure 2:
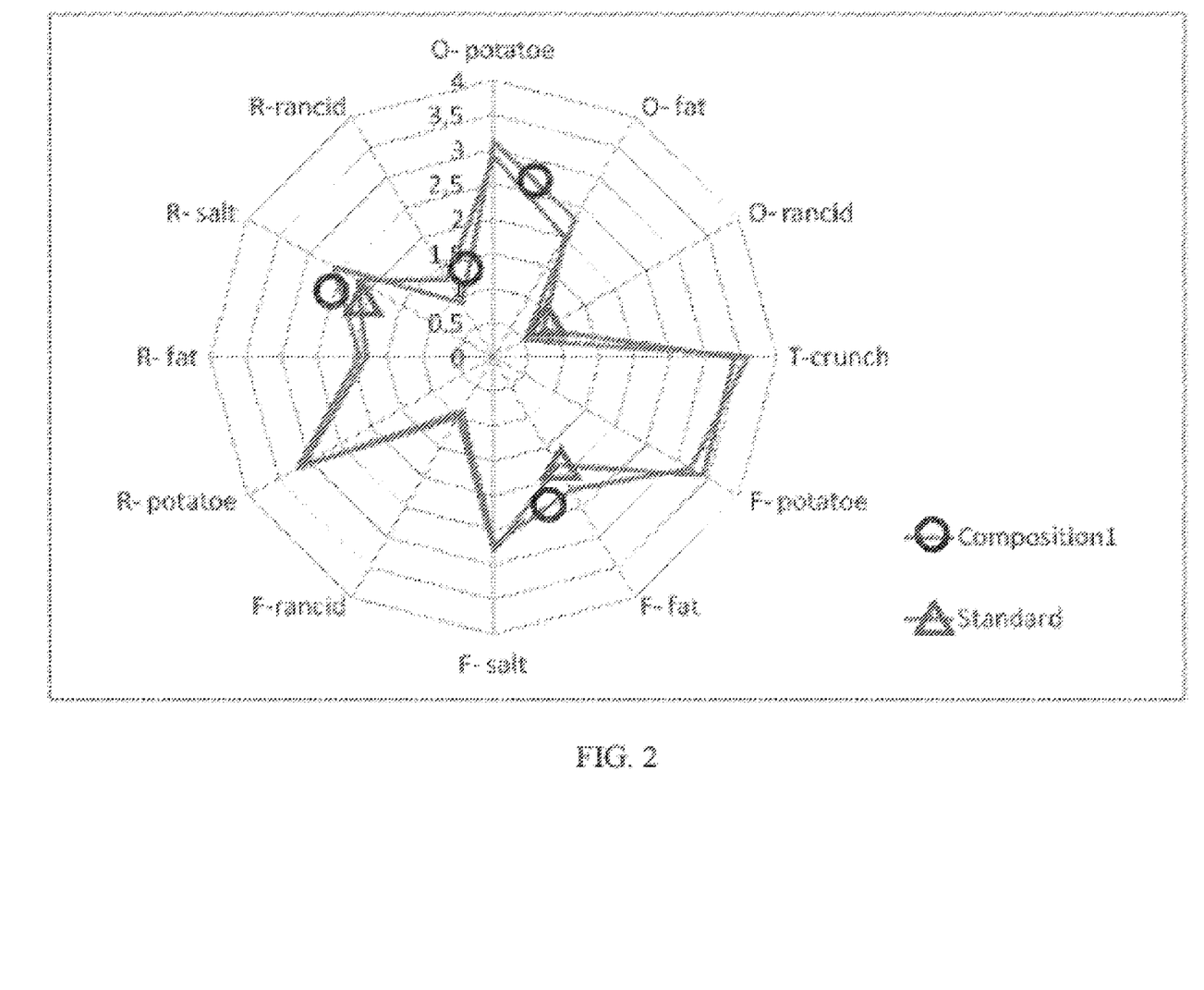
FIG. 2 shows sensory panel results of non-limiting examples of the present invention.

The sensory results related to the salty flavor, after tastes, texture and odors are showed in Table 20 and FIG. 2.

TABLE 20

| R: after taste/F: flavor/O: odor | Composition 1 | Standard |
|---|---|---|
| O-potato | 3.1 | 2.9 |
| O-fat | 2.3 | 2 |
| O-rancid | 0.5 | 0.8 |
| T-crunch | 3.6 | 3.4 |
| F-potato | 3.2 | 3.4 |
| F-fat | 2.2 | 1.8 |
| F-salt | 2.7 | 2.8 |
| F-rancid | 0.9 | 1 |
| R-potato | 3.2 | 3.1 |
| R-fat | 1.9 | 1.8 |
| R-salt | 2.6 | 2.2 |
| R-rancid | 0.9 | 1.3 |

The salty flavor is similar to the standard salt application in potato chips with composition 1 combined with 50% of standard salt to reduce 30% of the total sodium. The other sensory characteristics are also similar to the standard. The after taste salt flavor (R-salt) increased with the combined standard salt and composition 1 compared to standard salt and thus, allows for more time in the tongue to provide an extra salty taste that can be used to enhance flavors.

Example 3

Composition 2 was mixed with standard salt in order to reduce 28% of sodium and the mixture was then added in an oil slurry to cover extruded snacks and to check the sensorial characteristics according the following conditions:

TABLE 21

| Composition 2 | 60% |
|---|---|
| Standard salt | 40% |
| % sodium reduction | 28% |

Oil slurry composition: 90% palm oil+10% salt system/mixture

Temperature of the salt in oil slurry: 42-46 degrees C.

Snackweight before slurry application: 0.4-0.5 grams

Snackweight after the slurry application: 0.8-0.9 grams

Crystallization time and storage: 24-48 hours

Sensory Panel: 7 people minimum to evaluate the sensorial properties of the snacks, including the salt flavor (scores from 1 to 5 as maximum).

Figure 3:
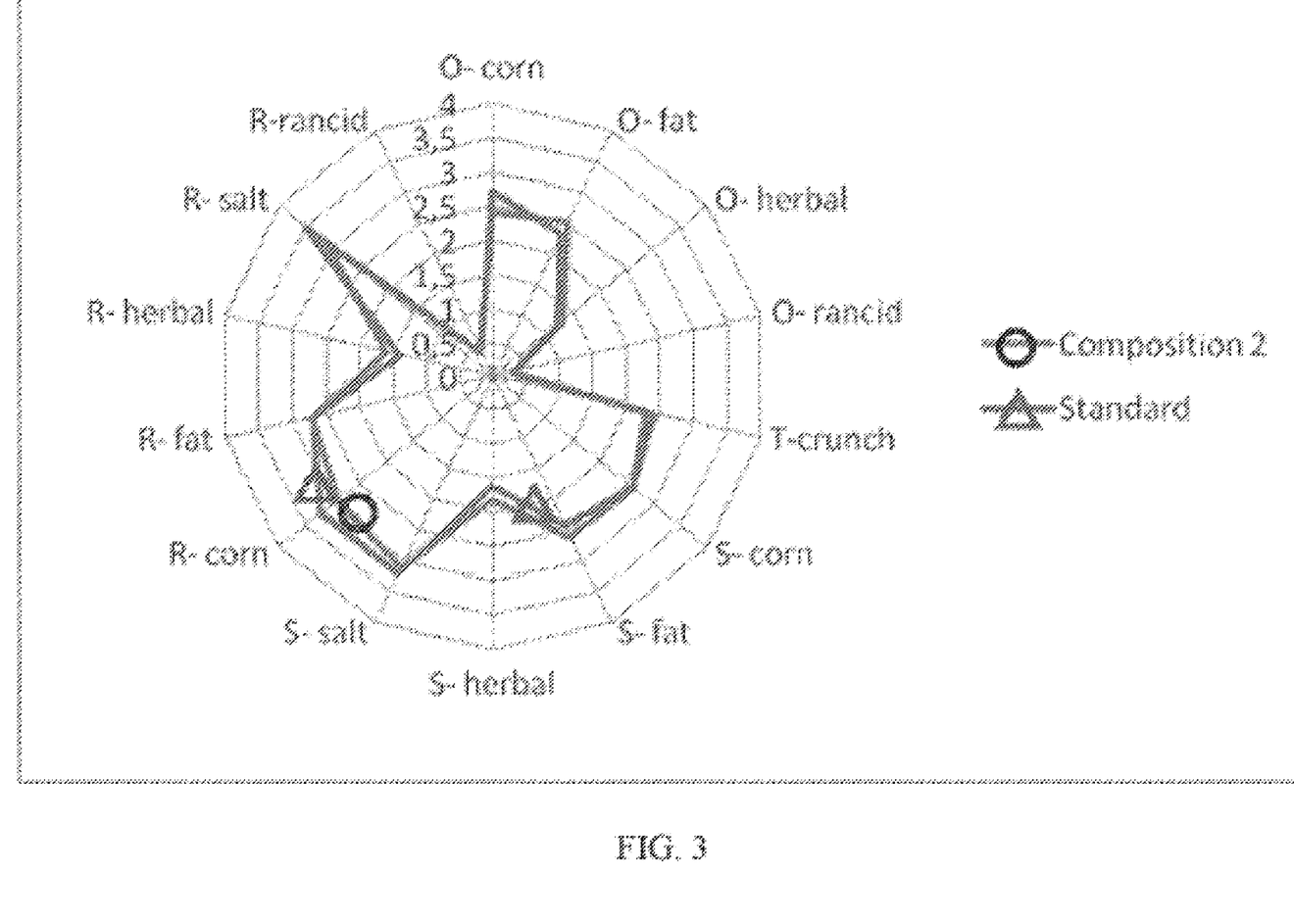
FIG. 3 shows sensory panel results of non-limiting examples of the present invention.

The results are shown in Table 22 and FIG. 3.

TABLE 22

| R: after taste/F: flavor/O: odor | Composition 2 | Standard |
|---|---|---|
| O-corn | 2.4 | 2.7 |
| O-fat | 2.5 | 2.2 |
| O-herbal | 1.3 | 1.2 |
| O-rancid | 0.3 | 0.3 |
| T-crunch | 2.4 | 2.3 |
| F-corn | 2.6 | 2.6 |
| F-fat | 2.6 | 2.4 |
| F-herbal | 1.8 | 1.4 |
| F-salt | 3.1 | 3.2 |
| R-corn | 2.9 | 3.2 |
| R-fat | 2.7 | 2.7 |
| R-herbal | 1.6 | 1.4 |
| R-salt | 3.1 | 3.5 |
| R-rancid | 0.4 | 0.4 |

The salty flavor is similar to the standard application in extruded snacks with composition 2 combined with 40% of standard salt to reduce 28% of sodium. The other sensory characteristics are also similar to the standard.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated)

I claim:

1. A powder composition comprising:
   20 weight % to 80 weight % of a triglycerides mixture, based on a total weight of the powder composition;
   15 weight % to 75 weight % of a salt mixture, based on the total weight of the powder composition;
   wherein, based on a total fatty acid content of the triglycerides mixture, the triglyceride mixture comprises:
   between 5% and 55% lauric acid content,
   between 2% and 30% myristic acid content,
   between 6% and 45% palmitic acid content, and
   between 2% and 25% stearic acid content;
   between 15% and 45% oleic acid content,
   15% or less linoleic acid content,
   10% or less linolenic acid content; and
   less than 2% of trans fatty acids
   wherein, the salt mixture comprises:
   at least 90 weight % sodium chloride, based on the total weight of the salt mixture and
   a remainder comprises at least one of sodium citrate, disodium citrate, monosodium tartrate, or disodium tartrate.

2. The composition of claim 1, further comprising 5 weight % to 30 weight % of a polysaccharides mixture, based on the total weight of the powder composition.

3. The composition of claim 2, wherein the polysaccharides mixture comprises 50 weight % to 99 weight % of maltodextrin of 20 dextrose equivalents based a total weight of the polysaccharides mixture.

4. The composition of claim 2, wherein the polysaccharides mixture comprises 50 weight % to 99 weight % of maltodextrin of 10 dextrose equivalents based a total weight of the polysaccharides mixture.

5. The composition of claim 2, wherein the polysaccharides mixture comprises 0.1 weight % to 30 weight % of glucose of 30 dextrose equivalents based a total weight of the polysaccharides mixture.

6. The composition of claim 2, wherein the polysaccharides mixture comprises 0.1 weight % to 30 weight % of fructose polymers based a total weight of the polysaccharides mixture, wherein the fructose polymers comprise at least one of inuline, oligofructose or polydextrose.

7. The composition of claim 1, further comprising 0.1 weight % to 25 weight % of a protein mixture, based a total weight of the powder composition.

8. The composition of claim 7, wherein the protein mixture comprises at least one of vegetable proteins or animal proteins.

9. The composition of claim 7, wherein the protein mixture comprises at least one of sodium caseinate, calcium caseinate, soybean concentrate protein, albumin concentrate protein, or bovine serum concentrate protein.

10. The composition of claim 9, wherein the protein mixture comprises:
   80 weight % to 100 weight % of the sodium caseinate, if present, and the calcium caseinate, if present, based on a total weight of the protein mixture,
   0.1 weight % to 15 weight % of the soybean concentrate protein, if present, based on the total weight of the protein mixture,
   0.1 weight % to 15 weight % of the albumin concentrate protein, if present, based on the total weight of the protein mixture, and
   0.1 weight % to 10 weight % of the bovine serum concentrate protein, if present, based on the total weight of the protein mixture.

11. The powder composition of claim 1, further comprising 0.1 weight % to 10 weight % of an emulsifier, based on the total weight of the powder composition.

12. The powder composition of claim 1, wherein the emulsifier comprises at least one of polysorbates, diacetyl tartaric esters, sorbitan esters, vegetable fatty acid esters, vegetable fatty acid polyesters, ricinoleic acid esters, ricinoleic acid polyesters, lactic acid esters, lactic acid polyesters, citric acid esters, citric acid polyesters, acetic acid esters, acetic acid polyesters, monoglycerides of fatty acids, diglycerides of fatty acids, or lecithin.

13. The powder composition of claim 1, further comprising 0.1 weight % to 10 weight % of a flavor mixture, based on the total weight of the powder composition; wherein the flavor mixture comprises at least one of vegetable species, fruits, spicy/hot tastes, cheese, caramel, butter, or sweet tastes.

14. The powder composition of claim 1, further comprising 0.1 weight % to 10 weight % of a color mixture, based on the total weight of the powder composition, wherein the color mixture selected of the group of yellow, orange, red, blue, green, violet, brown, or caramel.

15. The powder composition of claim 1, further comprising 0.01 weight % to 5 weight % of at least one of antioxidants or preservatives, based on the total weight of the powder composition, wherein the at least one of the antioxidants or the preservatives comprises at least one of TBHQ, BHT, ascorbil palmitate, propyl gallate, citric acid, tocopherols, tocotrienols, hidroxitiroxsol, resveratrol, or rosemary extract.

16. The powder composition of claim 1, further comprising 0.01 weight % to 3 weight % of anticaking agents, based on the total weight of the powder composition; wherein the anticaking agents comprise at least one of silica dioxide, tricalcic phosphate, or calcium silicate.

17. The powder composition of claim 1, wherein a sodium content of the powder composition is 5 weight % to 30 weight %, based on the total weight of the powder composition.

18. The powder composition of claim 1, wherein a moisture content of the powder composition is 0 weight % to 2 weight %, based on the total weight of the powder composition.

19. The powder composition of claim 1, wherein a particle size of the powder is in the range of 400 microns to 1200 microns.

20. The powder composition of claim 1, wherein the triglyceride mixture could be produced from the following oils and fats: palm oil and its fractions, palm kernel oil and its fractions, coconut oil and its fractions, soybean oil, rapeseed oil, canola oil, sunflower oil and the high oleic versions of these oil.

* * * * *